July 28, 1953     S. F. FOWLER     2,646,990
FIGURE FORMED CYCLE

Filed Nov. 9, 1951     3 Sheets-Sheet 1

INVENTOR.
SHORTIE FRANKLIN FOWLER
BY
Patrick D. Beavers
ATTORNEY

July 28, 1953      S. F. FOWLER      2,646,990
FIGURE FORMED CYCLE
Filed Nov. 9, 1951      3 Sheets-Sheet 2
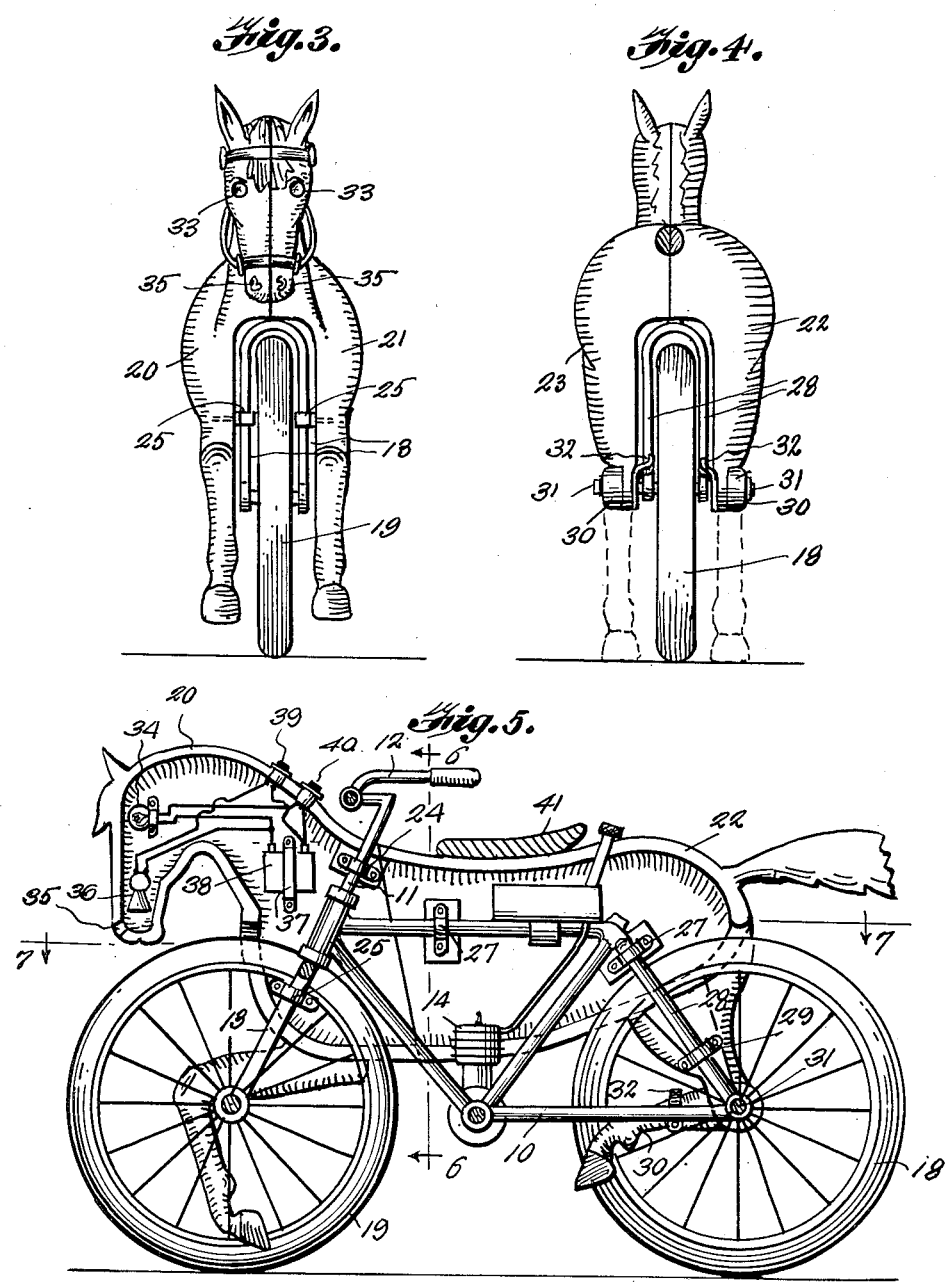
INVENTOR.
SHORTIE FRANKLIN FOWLER
BY
Patrick D Beavers
ATTORNEY July 28, 1953 S. F. FOWLER 2,646,990
FIGURE FORMED CYCLE
Filed Nov. 9, 1951 3 Sheets-Sheet 3
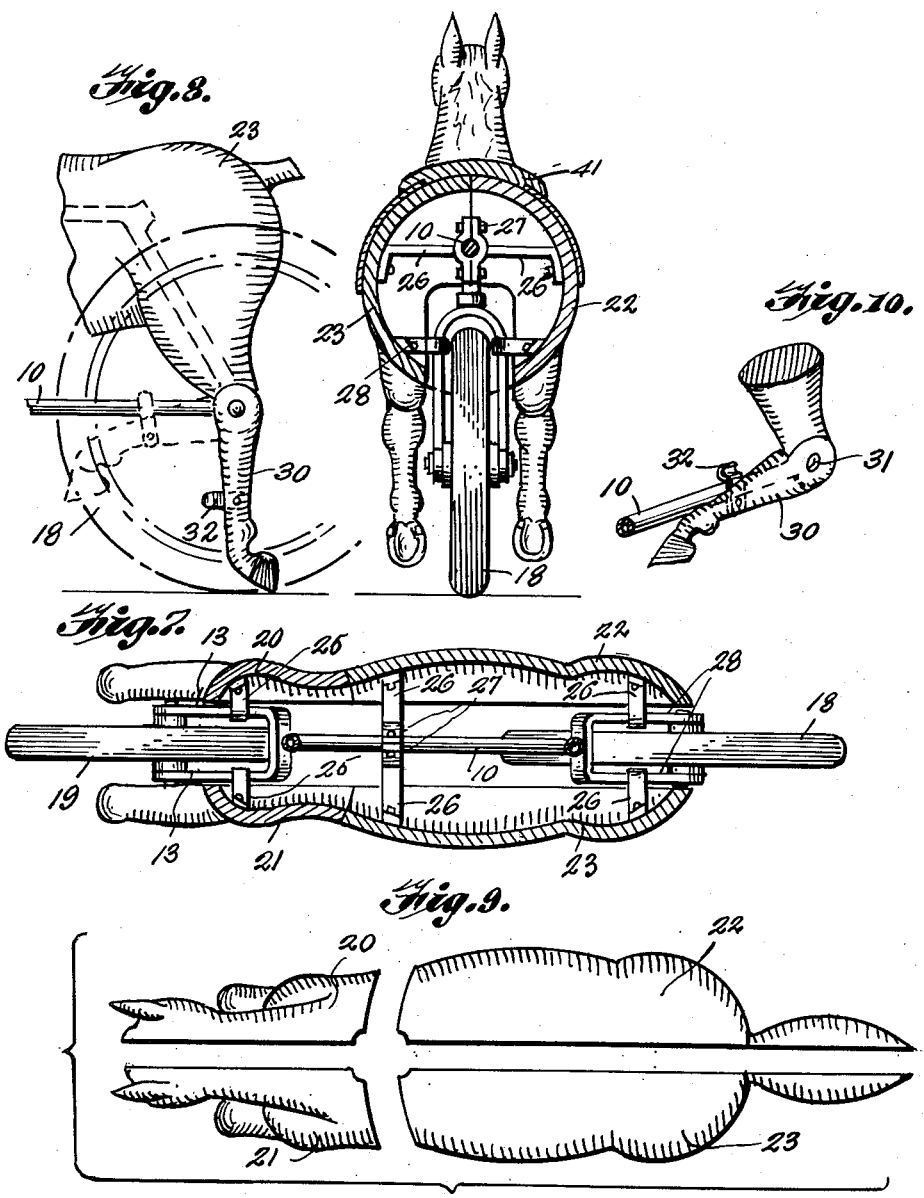
INVENTOR.
SHORTIE FRANKLIN FOWLER
BY
Patrick D. Beavers
ATTORNEY Patented July 28, 1953

2,646,990

UNITED STATES PATENT OFFICE 2,646,990

FIGURE FORMED CYCLE

Shortie Franklin Fowler, Warsaw, Ohio

Application November 9, 1951, Serial No. 255,620

1 Claim. (Cl. 280—1.189)

The present invention relates to a figure formed motorcycle and it consists in the combinations, constructions and arrangements of parts herein described and claimed.

Generally there is provided a motorcycle to the steering column and steering forks of which is affixed the complementary parts of the forepart of the figure of a horse and to the frame of which there is affixed by clamps or the like the complementary parts of the rear portion including the trunk of the figure of a horse. A saddle is provided and may be of conventional character. As the motorcycle is steered, the head, shoulders and forelegs of the horse figure are turned in the direction of the steering wheel of the motorcycle. One feature of the invention is the provision of hinged rear legs for the figure which are normally held in an upward position by means of clamps to the lower part of the frame of the motorcycle when the same is in motion but which may be moved downwardly out of engagement with the clamps to support the motorcycle and the figure when the device is at rest. The eyes of the horse figure provide openings through which the conventional headlights of the motorcycle may shine and a horn is concealed within the nose and mouth portion of the figure. Suitable buttons for controlling the lights and horns are placed upon the neck of the animal figure conveniently to the operator of the motorcycle.

It is accordingly an object of the invention to provide a device of the character set forth which is simple in construction, inexpensive to manufacture and yet effective and efficient in use.

Another object of the invention is to provide a device of the character set forth which will simulate to a large degree a natural horse and thus give added pleasure to a motorcycle rider.

Another object of the invention is the provision, in a device of the character set forth, of a novel and removable figure forming a part of the invention.

A still further object of the invention is the provision of a novel stand for a motorcycle.

Other and further objects of the invention will become apparent from a reading of the following specification taken in conjunction with the drawing, in which.

Figure 1:
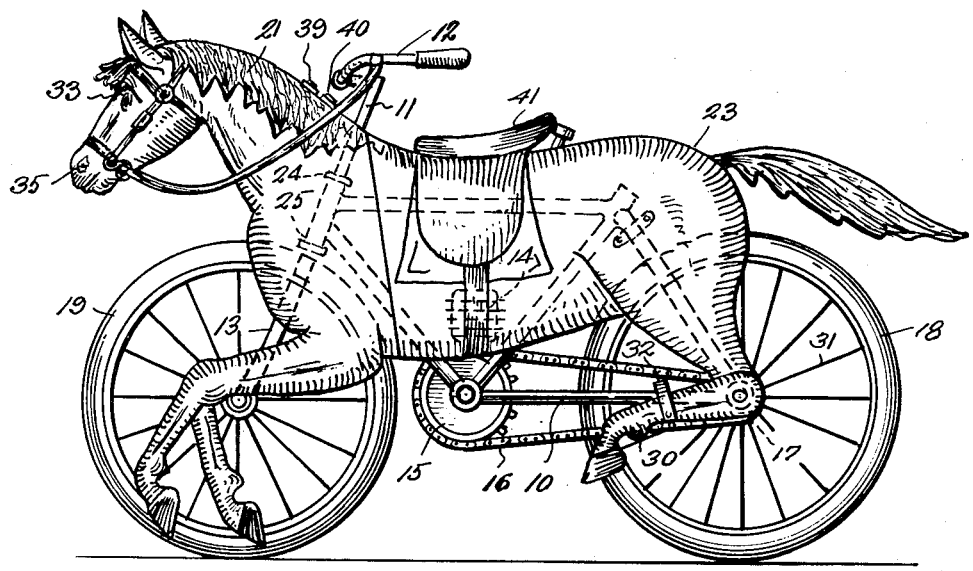
Figure 1 is a side elevational view of an embodiment of the invention.
Figure 2:
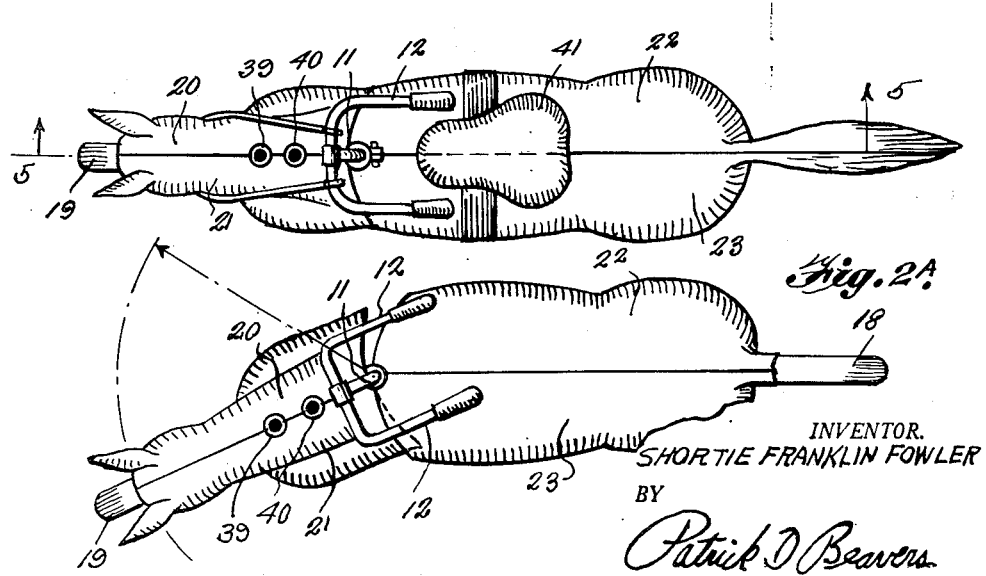
Figure 2 is a plan view thereof.

Figure 2A is a plan view, partly broken away, similar to Figure 2 but showing the same as it would appear when being steered, Figure 3 is a front elevational view of the device illustrated in Figures 1 and 2, Figure 4 is a rear elevational view thereof, Figure 5 is a sectional view taken along line 5—5 of Figure 2, Figure 6 is a sectional view taken along line 6—6 of Figure 5, Figure 7 is a sectional view taken along line 7—7 of Figure 5, Figure 8 is a fragmentary side elevational view illustrating a novel stand forming a part of the invention, Figure 9 is an exploded plan view of the body of a horse figure forming a part of the invention, and Figure 10 is a fragmentary perspective view illustrating a clamp forming a part of the invention.

Referring more particularly to the drawing, there is shown therein a motorcycle having a frame 10 and provided with a steering column 11 to the upper end of which is attached the conventional handle bars 12 and to the lower end of which is affixed a steering fork 13. A motor 14 is provided for driving a drive sprocket 15 which is connected by means of a chain 16 to the driven sprocket 17 which is adapted to drive the rear wheel 18 of the motorcycle. Mounted in the fork 13 is the conventional steering wheel 19.

There is provided the figure of a horse which is formed of right and left forepart sections which are complementary to each other and which are indicated at 20 and 21, respectively. There is also provided a right and left complementary rear section 22 and 23, respectively.

The sections 20 and 21 are each affixed to the steering post 11 and forks 13 by means of clamps 24 and 25, respectively, while the sections 22 and 23 are each provided with inwardly extending brackets 26 which are clamped to the frame 10 at their inner ends, as indicated at 27. That portion of the sections 22 and 23 which form the upper rear legs are clamped to the rear forks 28 of the frame 10, as indicated at 29. The lower portions of the rear legs of the figure are indicated at 30 and each is pivotally connected to the rear axle 31 of the motorcycle and each is provided with a clamp member 32 upon its inner side which clamp member is adapted to engage the frame 10 when in raised position.

In those portions of the sections 20 and 21 which form the head of the horse figure there is provided a pair of eye openings 33 immediately behind which is positioned in each case a lamp 34 and in those portions of the sections 20 and 21 which form the nose and mouth of the horse figure there is provided open nostrils 35 immediately behind which is affixed a horn 36. Within the neck portion of the figure there is mounted by means of a bracket 37 a battery 38 while upon the upper side of the neck portion of the figure there is provided a horn button 39 and a light button or switch 40. The buttons 39 and 40, the battery 38, the horn 36 and the lamp 34 are properly connected by means of wiring as shown in Figure 5.

A saddle 41 which may be conventional in nature is mounted atop the trunk portion of the sections 21 and 23.

In operation, it will be apparent that the motorcycle may be operated in conventional manner but that when the same is steered by means of the handlebars 12 that the head and neck portions together with the forelegs of the horse figure will turn to the right or left along with the steering column 11 and the steering wheel 19. It will also be apparent that the rider of the motorcycle may be seated upon the saddle 41 and that while the motorcycle is in motion the rear legs of the horse figure may be drawn upwardly, as shown in Figure 5, whereby to allow the clamp members 32 to engage the frame 10 but that when it is desired to stop the motorcycle and to maintain the same in an upright position, it is only necessary to move the legs 31 downwardly to the dotted line position shown, for example in Figure 1, thereby to support the motorcycle in conventional upright position. The lamps shining through the eye openings 33 and the horn mounted in the mouth and nose portions of the figure lend reality and amusement to the device.

While but one form of the invention has been shown and described herein, it will be readily apparent to those skilled in the art that many minor modifications may be made without departing from the spirit of the invention or the scope of the appended claim.

What is claimed is:

An attachment for two-wheeled cycles having a frame, a steering column and a front wheel fork comprising a figure in the shape of a horse, said figure being composed of a pair of complementary forward sections and a pair of complementary rearward sections, clamps for attaching said forward sections to said steering column and to said steering wheel fork, clamps for attaching said rearward sections to said frame, an upwardly swingable leg portion for each of said rearward sections, said leg portions forming a support for said cycle when in lowered position, and a clamp affixed to the inner side of each of said leg portions for removable engagement with said frame when said leg portions are in raised condition.

SHORTIE FRANKLIN FOWLER.

References Cited in the file of this patent

UNITED STATES PATENTS

| Number | Name | Date |
| --- | --- | --- |
| 586,040 | Judge | July 6, 1897 |
| 692,383 | Tarzian | Feb. 4, 1902 |
| 777,369 | Hayes | Dec. 13, 1904 |
| 1,270,169 | Kester | June 18, 1918 |
| 1,308,425 | Johnson | July 1, 1919 |
| 1,871,592 | Doody | Aug. 16, 1932 |
| 2,225,560 | Hartman | Dec. 17, 1940 |
| 2,599,309 | Wunderly | June 3, 1952 |